United States Patent
Li et al.

(10) Patent No.: US 11,455,965 B2
(45) Date of Patent: Sep. 27, 2022

(54) DISPLAY DEVICE AND DRIVING METHOD THEREOF, DISPLAY SYSTEM AND DISPLAY METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Yakun Li, Beijing (CN); Mingchao Wang, Beijing (CN); Bin Feng, Beijing (CN); Peng Sun, Beijing (CN)

(73) Assignees: Beijing BOE Technology Development Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 837 days.

(21) Appl. No.: 16/072,343

(22) PCT Filed: Dec. 20, 2017

(86) PCT No.: PCT/CN2017/117404
§ 371 (c)(1),
(2) Date: Jul. 24, 2018

(87) PCT Pub. No.: WO2018/153154
PCT Pub. Date: Aug. 30, 2018

(65) Prior Publication Data
US 2021/0210032 A1 Jul. 8, 2021

(30) Foreign Application Priority Data
Feb. 22, 2017 (CN) .................. 201710095416.X

(51) Int. Cl.
*G09G 3/36* (2006.01)
*G02B 5/30* (2006.01)
*G02F 1/1335* (2006.01)

(52) U.S. Cl.
CPC .......... *G09G 3/3607* (2013.01); *G02B 5/3025* (2013.01); *G02F 1/133528* (2013.01); *G09G 2300/0452* (2013.01); *G09G 2358/00* (2013.01)

(58) Field of Classification Search
CPC ...... G09G 3/3607; G09G 3/3696; G09G 3/36; G09G 2320/068; G09G 2320/028;
(Continued)

(56) References Cited

U.S. PATENT DOCUMENTS

| | | | |
|---|---|---|---|
| 2008/0191966 A1* | 8/2008 | Van Berkel | .......... H04N 13/317 345/32 |
| 2012/0019752 A1 | 1/2012 | He et al. | |

(Continued)

FOREIGN PATENT DOCUMENTS

| | | |
|---|---|---|
| CN | 102338936 A | 2/2012 |
| CN | 102651819 A | 8/2012 |

(Continued)

OTHER PUBLICATIONS

International Search Report and Written Opinion in corresponding International Patent Application No. PCT/CN2017/117404 dated Mar. 16, 2018. 20 pages.

*Primary Examiner* — Sanjiv D. Patel
(74) *Attorney, Agent, or Firm* — Leason Ellis LLP

(57) ABSTRACT

A display device and a driving method thereof, a display system and a display method thereof are provided, including a display panel, which includes a plurality of pixel units; a first optical film sheet provided on the plurality of pixel units. At least one of the pixel units includes a sub-pixel unit of a first color, and the sub-pixel unit of the first color includes at least a display sub-pixel unit of the first color and a disturbing sub-pixel unit of the first color. The first optical film sheet includes a first sub-optical-film unit to allow transmission of light emitted by the display sub-pixel-unit of
(Continued)

the first color and a second sub-optical-film unit to allow transmission of light emitted by the disturbing sub-pixel unit of the first color, and polarization states of lights emitted from the first sub-optical film unit and the second sub-optical film unit differ from each other.

16 Claims, 3 Drawing Sheets

(58) Field of Classification Search
CPC ............ G09G 2358/00; G09G 3/3648; G09G 2300/0452; G09G 2354/00; G09G 2300/0426; G09G 2300/0443; G09G 2300/0447; G09G 3/2074; G02F 1/133352; G02F 1/133528; G02F 1/133533; G02F 1/133753; G02F 1/1323; G02F 2201/52
See application file for complete search history.

(56) References Cited

U.S. PATENT DOCUMENTS

| | | |
|---|---|---|
| 2013/0076785 A1 | 3/2013 | Chen |
| 2014/0292839 A1* | 10/2014 | Huang ................. G09G 3/3413 |
| | | 345/694 |
| 2016/0011450 A1* | 1/2016 | Li ....................... H01L 27/3218 |
| | | 345/4 |
| 2016/0048055 A1 | 2/2016 | Dong et al. |
| 2016/0275884 A1* | 9/2016 | Cho ..................... H04N 13/337 |

FOREIGN PATENT DOCUMENTS

| | | |
|---|---|---|
| CN | 103235441 A | 8/2013 |
| CN | 104122705 A | 10/2014 |
| CN | 105182637 A | 12/2015 |

* cited by examiner

DISPLAY DEVICE AND DRIVING METHOD THEREOF, DISPLAY SYSTEM AND DISPLAY METHOD THEREOF

CROSS REFERENCE TO RELATED APPLICATIONS

The present application is a U.S. National Stage Application under 35 U.S.C. § 371 of International Patent Application No. PCT/CN2017/117404, filed Dec. 20, 2017, which claims priority of Chinese patent application No. 201710095416.X filed on Feb. 22, 2017 to SIPO, both of which are incorporated herein by reference in its entirety as a part of the present application.

TECHNICAL FIELD

At least one embodiment of the present disclosure provides a display device and a driving method thereof, a display system and a display method thereof.

BACKGROUND

With large-scalization of a display and enlargement of its viewing angle, how to prevent information loss due to peeping has already attracted consumer's attention increasingly. The current anti-peep techniques for displays substantially follow the way of narrowing the viewing angle, so as to make a person within a certain view-angle range unable to see the displayed information. However, a user will also be restricted to a certain degree upon normal watching while the viewing angle is narrowed, and moreover an effect of anti-peep cannot be achieved within a certain view-angle range. That is, this kind of anti-peep technique is still unable to achieve the anti-peep and security functions actually, and cannot fully satisfy the use demands of consumers.

SUMMARY

At least one embodiment of the present application provides a display device, comprising: a display panel, including a plurality of pixel units; and a first optical film sheet provided on the display panel. At least one of the pixel units includes a sub-pixel unit of a first color, and the sub-pixel unit of the first color includes a display sub-pixel unit of the first color and a disturbing sub-pixel unit of the first color, the first optical film sheet includes a first sub-optical-film unit configured to allow the transmission of light emitted by the display sub-pixel unit of the first color and a second sub-optical-film unit configured to allow transmission of light emitted by the disturbing sub-pixel unit of the first color, and the first sub-optical-film unit and the second sub-optical-film unit being arranged to allow polarization states of lights emitted from the first sub-optical-film unit and the second sub-optical-film unit to differ from each other.

For example, in the display device provided by at least one embodiment of the present application, the first sub-optical-film unit is configured to allow a transmitted light to be a non-polarized light, and the second sub-optical-film unit is configured to allow a transmitted light to be a polarized light.

For example, in the display device provided by at least one embodiment of the present application, the second sub-optical-film unit is configured to allow a transmitted light to be a linearly polarized light.

For example, in the display device provided by at least one embodiment of the present application, the first sub-optical-film unit is configured to allow a transmitted light to be a first polarized light, and the second sub-optical-film unit is configured to allow a transmitted light to be a second polarized light, polarization directions of the first polarized light and the second polarized light being different.

For example, in the display device provided by at least one embodiment of the present application, the first polarized light and the second polarized light are both linearly polarized lights, or the first polarized light and the second polarized light are both circularly polarized lights.

For example, in the display device provided by at least one embodiment of the present application, in case that the first polarized light and second polarized light are both linearly polarized lights, polarization direction of the first polarized light and polarization direction of the second polarized light are substantially perpendicular to each other, or in case that the first polarized light and second polarized light are circularly polarized lights, polarization direction of the first polarized light and polarization direction of the second polarized light are opposite to each other.

For example, in the display device provided by at least one embodiment of the present application, the display sub-pixel unit of the first color and the disturbing sub-pixel unit of the first color are adjacent to each other in a longitudinal direction or a lateral direction of the display panel.

For example, in the display device provided by at least one embodiment of the present application, further comprising a driving circuit connected with the sub-pixel unit. The driving circuit is configured to control a display grayscale of the display sub-pixel unit of the first color and a display grayscale of the disturbing sub-pixel unit of the first color.

For example, in the display device provided by at least one embodiment of the present application, the driving circuit is configured to allow the display grayscale of the display sub-pixel unit of the first color and the display grayscale of the disturbing sub-pixel unit of the first color to be complementary with each other.

For example, in the display device provided by at least one embodiment of the present application, the display grayscale of the disturbing sub-pixel unit of the first color has a first fixed value; or difference between the display grayscale of the display sub-pixel unit of the first color and the display grayscale of the disturbing sub-pixel unit of the first color has a second fixed value.

For example, in the display device provided by at least one embodiment of the present application, at least one of the pixel units further includes at least one sub-pixel unit of other color in addition to the sub-pixel unit of the first color.

For example, in the display device provided by at least one embodiment of the present application, at least one of the sub-pixel units of other colors includes a display sub-pixel unit and a disturbing sub-pixel unit corresponding to its color; the first optical film sheet includes sub-optical-film units disposed corresponding to the display sub-pixel unit and the disturbing sub-pixel unit, respectively, so that polarization state of light passing through the display sub-pixel unit and the first optical film sheet and polarization state of light passing through the disturbing sub-pixel unit and the first optical film sheet differ from each other.

At least one embodiment of the present application provides a display system, comprising any of the display devices; a pair of glasses. The pair of glasses is configured to allow transmission of light emitted by the display sub-pixel unit of the first color of the display panel, and to block light emitted by the disturbing sub-pixel unit of the first color of the display panel.

At least one embodiment of the present application provides a driving method of any of the display devices, comprising: driving the display sub-pixel unit of the first color in the display panel so as to be used for forming a displayed image of the first color; and driving the disturbing sub-pixel unit of the first color in the display panel so as to be used for forming a disturbing image of the first color.

For example, in the driving method provided by at least one embodiment of the present application, the displayed image and the disturbing image are complementary images.

At least one embodiment of the present application provides a display method of the display system, comprising: controlling the display sub-pixel unit of the first color in the display panel so as to form a displayed image of the first color; and controlling the disturbing sub-pixel unit of the first color in the display panel so as to form a disturbing image of the first color; and blocking the disturbing image of the first color and allowing the displayed image of the first color to be transmitted by the pair of glasses.

BRIEF DESCRIPTION OF THE DRAWINGS

To illustrate technical solutions in embodiments of the present disclosure more clearly, accompanied drawings of embodiments will be briefly introduced below. It is apparent that the accompanied drawings described below are merely related to some embodiments of the present disclosure, but are not construed as limiting of the present disclosure.

DETAILED DESCRIPTION

Figure 1:
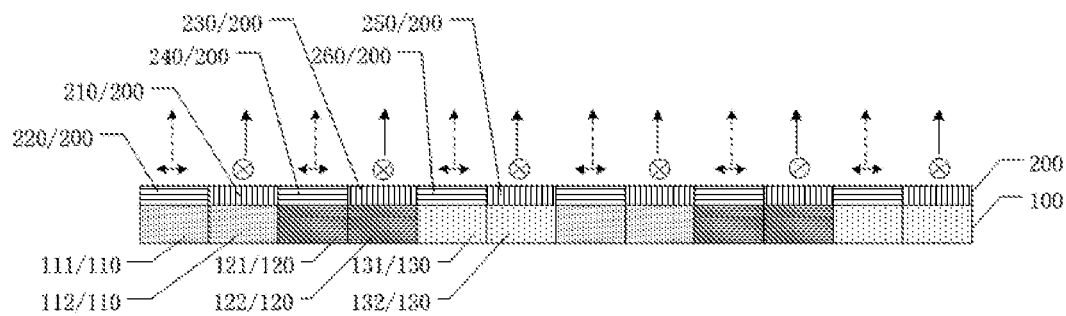
FIG. 1 is a schematically structural view showing a cross section of a display device provided by an embodiment of the present disclosure.

Technical solutions of the embodiments will be described in a clearly and fully understandable way in connection with the drawings related to the embodiments of the present disclosure. It is apparent that the described embodiments are just a part but not all of the embodiments of the present disclosure. Based on the described embodiments herein, one of ordinary skill in the art can obtain other embodiment(s), without any creative work, which shall be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right" or the like are only used to indicate relative position relationship, and when the position of the object which is described is changed, the relative position relationship may be changed accordingly.

At least one embodiment of the present disclosure provides a display device and a driving method thereof, a display system and a display method thereof. The display device includes a display panel and a first optical film sheet located on the display panel. The display panel includes a plurality of pixel units, and at least one of the pixel units includes at least a display sub-pixel unit of a first color and a disturbing sub-pixel unit of a first color. The first optical film sheet includes a first sub-optical-film unit for allowing transmission of light emitted by the display sub-pixel unit of the first color and a second sub-optical-film unit for allowing transmission of light emitted by the disturbing sub-pixel unit of the first color, and the first sub-optical-film unit and the second sub-optical-film unit are arranged in such a way that the polarization states of lights emitted from the first sub-optical-film unit and the second sub-optical-film unit differ from each other. Hereinafter, descriptions will be made with reference to an example in which each of the pixel units includes at least a display sub-pixel unit of a first color and a disturbing sub-pixel unit of a first color. At the location of each of pixel units of the display panel, light emitted by the display sub-pixel unit of the first color and light emitted by the disturbing sub-pixel unit of the first color are provided by the display device to a user concurrently. For example, for a peeper, it is incapable of distinguishing the content provided by the display sub-pixel unit of the first color (the image expected to be displayed) due to simultaneous acceptance of two kinds of light in a naked-eye state in the peeper's eyes, while a user can see the image expected to be displayed by only accepting the content provided by the display sub-pixel unit of the first color. In this way, the display device and a corresponding display system can have a function of anti-peep. Furthermore, with this design structure, the viewing angle of the display device may not be restricted while the function of anti-peep is achieved.

It is to be noted that, in the display device provided by at least one embodiment of the present disclosure, the display sub-pixel unit of the first color and the disturbing sub-pixel unit of the first color in each of pixel units may collectively function as one sub-pixel unit of the first color. Moreover, "the first color" merely represents division of sub-pixel units of different colors in each of pixel units, and color of light emitted by sub-pixel units represented by "the first color" in different pixel units may differ. Taking such a case that each of pixel units includes sub-pixel units in three colors of red, green and blue as an example, the sub-pixel unit of the first color in a first pixel unit may be a red sub-pixel unit, the sub-pixel unit of the first color in a second pixel unit may be a green sub-pixel unit, and the sub-pixel unit of the first color in a third pixel unit may be a blue sub-pixel unit, and so on.

For the convenience of description of technical solutions of the present disclosure, in at least one embodiment of the present disclosure, description will be made with reference to an example in which color of sub-pixel units of the first color in different pixel units is the same. For example, taking such a case that a sub-pixel unit of the first color in one pixel unit in the display panel represents a red sub-pixel unit as an example, a sub-pixel unit of the first color in every other pixel unit also represents a red sub-pixel unit.

A light emitted by a display sub-pixel unit of the first color and a light emitted by a disturbing sub-pixel unit of the first color are two polarization states. For example, by providing a special observation device (e.g. a pair of glasses 300 provided in the following embodiments of the present disclosure) that is capable of filtering out the light provided by a disturbing sub-pixel unit or merely receives the light provided by a display sub-pixel unit, it is possible that a user is permitted to normally receive a displayed image without being affected by a disturbing image.

According to at least one embodiment of the present disclosure, a display device is provided. FIG. 1 is a schematically structural view showing a cross section of a display device provided by an embodiment of the present disclosure, and direction of the cross section may be perpendicular to the direction of a plane where the display device is located. For example, as shown in FIG. 1, the display device includes a display panel 100 and a first optical film sheet 200 on the display panel 100. In the display panel 100, a plurality of pixel units are included (not shown in FIG. 1, refer to zone A in FIG. 2), which are arranged in an array. In order to achieve display, each of pixel units, for example, includes sub-pixel units of three primary colors of R, G, and B, and sub-pixel units of R, G, and B, for example, are arranged in a same row or a same column, or arranged in delta (Δ) form, or the like.

Each of the pixel units includes a display sub-pixel unit 112 of a first color (e.g. one of red, green and blue) and a disturbing sub-pixel unit 111 of the first color. The first optical film sheet 200 includes a first sub-optical-film unit 210 for allowing transmission of light emitted by the display sub-pixel unit 112 of the first color and a second sub-optical-film unit 220 for allowing transmission of light emitted by the disturbing sub-pixel unit 111 of the first color, and the first sub-optical-film unit 210 and the second sub-optical-film unit 220 are provided in such a way that the polarization states of lights emitted from the first sub-optical-film unit 210 and the second sub-optical-film unit 220 differ from each other.

For example, in the example shown in FIG. 1, in each of pixel units, a sub-pixel unit of each color (e.g. a sub-pixel unit 110 of the first color) is not limited to only include, for example, one display sub-pixel unit 112 of the first color and one disturbing sub-pixel unit 111 of the first color, and may also include a plurality of display sub-pixel units 112 of the first color and a plurality of disturbing sub-pixel units 111 of the first color. As long as a disturbing sub-pixel unit 111 of the first color that can emit light for display of a disturbing image and a display sub-pixel unit 112 of the first color that can emit light for display of a displayed image are included in the sub-pixel unit 110 of the first color, and a first sub-optical-film unit 210 is provided correspondingly on the display sub-pixel unit 112 of the first color and a second sub-optical-film unit 220 is provided correspondingly on the disturbing sub-pixel unit 111, it is possible that the pixel unit can be used to form a displayed image and a disturbing image. Lights for displaying these two images have different polarization states, so as to achieve a technical effect of avoiding peep.

It is to be noted that, in at least one embodiment of the present disclosure, polarization states of lights coming out of the first sub-optical-film unit 210 and the second sub-optical-film unit 220 differ from each other so as to achieve a technical effect of anti-peep, but polarization state of light may have a variety of choices due to the provision of the first optical film sheet 200, and polarization state of light also has a variety of choices, such as linear polarization, circular polarization and so on. Moreover, polarization directions of light having different polarization states are different. For example, an angle is formed between polarization directions of different linearly polarized lights, and polarization directions of different circularly polarized lights are opposite to each other (namely, rotating directions of a left-handed circularly polarized light and a right-handed circularly polarized light are opposite to each other), and so on.

For the convenience of description of the present disclosure, one of the cases is chosen to illustrate the following embodiments. For example, both of the first sub-optical-film unit and the second sub-optical-film unit are configured to allow the transmitted light to be a linearly polarized light, and for example, polarization directions of linearly polarized lights with different polarization states that are transmitted by the first sub-optical-film unit and the second sub-optical-film unit are substantially perpendicular to each other. With the cross section of the display device shown in FIG. 1 as a reference, that is, for example, light transmitted by a first optical film sheet is a linearly polarized light, the second sub-optical-film unit is so arranged that polarization direction (denoted by a symbol "↔" in FIG. 1) of a transmitted light is along the direction parallel to a paper plane, and the first sub-optical-film unit is so arranged that polarization direction (denoted by a symbol "⊗" in FIG. 1) of a transmitted light is along the direction perpendicular to the paper plane.

In at least one embodiment of the present disclosure, polarization states of lights that emit from a first sub-optical-film unit and a second sub-optical-film unit are different. For example, it may at least include the following two instances: lights emitting from a first sub-optical-film unit and a second sub-optical-film unit are both polarized lights; or, light-emitting from one of a first sub-optical-film unit and a second sub-optical-film unit is a polarized light, and for example, light-emitting from the second sub-optical-film unit is a polarized light.

For example, in at least one embodiment of the present disclosure, as shown in FIG. 1, lights emitting from a first sub-optical-film unit 210 and a second sub-optical-film unit 220 in the first optical film sheet 200 have two polarization states, respectively.

For example, in a display device provided by at least one embodiment of the present disclosure, a first sub-optical-film unit is configured to allow the transmitted light to be a first polarized light, and a second sub-optical-film unit is configured to allow the transmitted light to be a second polarized light, polarization directions of the first polarized light and the second polarized light being different. For example, light emitted by the display panel is a non-polarized light, that is, light coming out of a sub pixel unit 110 of the first color is a non-polarized light, and the first optical film sheet 200, for example, may be used as a polarizer, so as to change polarization state of the non-polarized light. For example, a first sub-optical-film unit 210 and a second sub-optical-film unit 220 have structures with different polarizing functions. For example, the first sub-optical-film unit 210 makes the transmitted light be a first polarized light, the second sub-optical-film unit 220 makes the transmitted light be a second polarized light, and polarization directions of the first polarized light and the second polarized light are different. Consequently, the polarization states of lights coming out of the two units differ from each other.

In at least one embodiment of the present disclosure, in an instance that each of the first sub-optical-film unit 210 and the second sub-optical-film unit 220 allows the transmitted light to be a polarized light, no limitation will be made to the type of the polarized light, as long as polarization directions of transmitted lights for the two units are different. For example, in at least one embodiment of the present disclosure, a first polarized light is one of a linearly polarized light and a circularly polarized light, and a second polarized light is the other of the linearly polarized light and the circularly polarized light.

For example, in at least one embodiment of the present disclosure, in an instance that each of the first polarized light and second polarized light is a linearly polarized light, polarization direction of the first polarized light and polarization direction of the second polarized light are substantially perpendicular to each other. For example, polarization directions of the first polarized light and the second polarized light are perpendicular to each other. In at least one embodiment of the present disclosure, the relationship between the polarization direction of a light transmitted by the first sub-optical-film unit 210 and the polarization direction of a light transmitted by the second sub-optical-film unit 220 is not limited to an instance of strictly perpendicular to each other, and the above two polarization directions may vary within a certain angle range (e.g., between 0 and 10 degrees) with reference to the instance of perpendicular to each other (i.e., the included angle being 90 degrees). For example, an included angle between polarization direction of a light transmitted by the first sub-optical-film unit 210 and polarization direction of a light transmitted by the second sub-optical-film unit 220 may be about 80 degrees to 100 degrees, and further, may be about 85 degrees to 95 degrees.

For example, in at least one embodiment of the present disclosure, in an instance that the first polarized light and second polarized light are circularly polarized lights, polarization direction of the first polarized light and polarization direction of the second polarized light may be opposite to each other. In this way, a user can filter out the second polarized light by aid of a special observation device (e.g., a pair of glasses 300 in the following embodiments of the present disclosure), and can observe an image formed by the first polarized light. That is, a user can normally receive a displayed image without being affected by a disturbing image, and the display device has a function of anti-peep.

Figure 2:
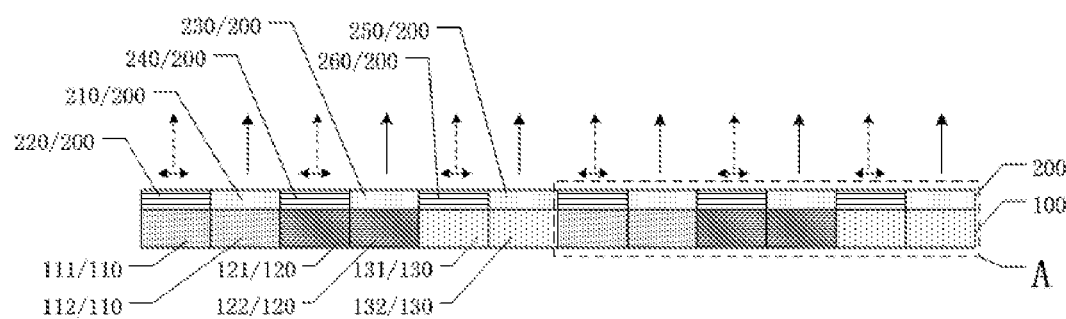
FIG. 2 is a schematic view showing the working principle of a display device provided by an embodiment of the present disclosure.
Figure 4:
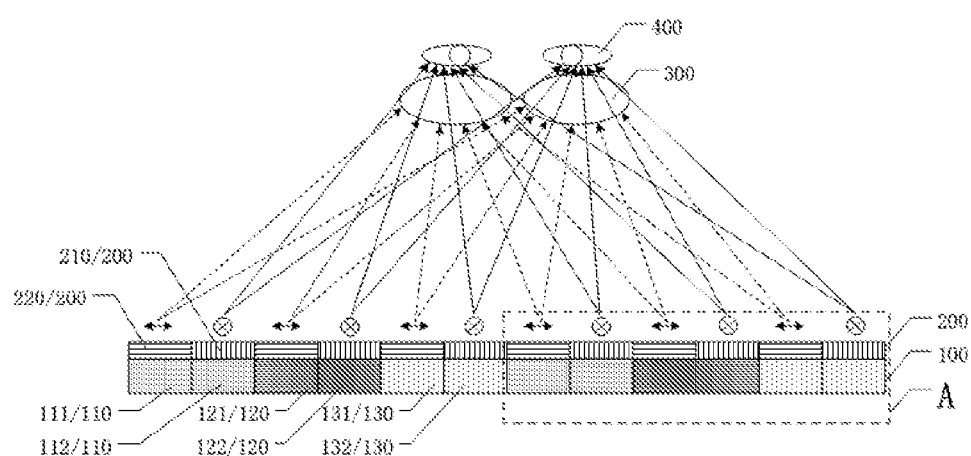
FIG. 4 is a schematically structural view showing a display system provided by an embodiment of the present disclosure.

For example, in at least one embodiment of the present disclosure, a first sub-optical-film unit is configured to allow the transmitted light to be a non-polarized light, and a second sub-optical-film unit is configured to allow the transmitted light to be a polarized light. FIG. 2 is a schematic view showing the working principle of a display device provided by an embodiment of the present disclosure. Exemplarily, as shown in FIG. 2, description will be made with reference to an example in which outgoing light of the first sub-optical-film unit 210 is a non-polarized light and outgoing light of the second sub-optical-film unit 220 is a polarized light. For example, light provided by a sub-pixel unit 110 of a first color is a non-polarized light, while the second sub-optical-film unit 220 located on a disturbing sub-pixel unit 111 of the first color is a polarizing structure, and the first sub-optical-film unit 210 located on a display sub-pixel unit 112 of the first color is a non-polarizing structure. In this way, a disturbing image formed by light coming out of the disturbing sub-pixel unit 111 of the first color may produce interference in a displayed image formed by light coming out of the display sub-pixel unit 112 of the first color, so as to prevent peeping. Furthermore, because polarization states of lights for displaying two kinds of images differ from each other, it is possible that the polarized light that forms the disturbing image is removed by, for example, a corresponding device (e.g., a pair of glasses 300 with polarizers, as shown in FIG. 4), and the light that forms the displayed image is at least partially transmitted. Consequently, a normal displayed image can be provided to the user.

It is to be noted that, in at least one embodiment of the present disclosure, the first sub-optical-film unit may be arranged to make the transmitted light be a polarized light, and the second sub-optical-film unit may be arranged to make the transmitted light be a non-polarized light. With reference to an example in which a corresponding device (e.g., a pair of glasses 300 with polarizers, as shown in FIG. 4) is provided, a user can see all the polarized lights transmitted through the first sub-optical-film unit and a part of lights transmitted through the second sub-optical-film unit by aid of the pair glasses 300, and at the same time, the glasses 300 can filter out the other lights transmitted through the second sub-optical-film unit. For example, by designing grayscale of a display sub-pixel unit and a disturbing sub-pixel unit, it is possible to allow all of the polarized lights transmitted by the first sub-optical-film unit and a part of lights transmitted by the second sub-optical-film unit to form a displayed image together, and the other lights transmitted through the second sub-optical-film unit form a disturbing image. In this way, it is also possible to allow a displayed image provided by pixel units to produce interference with the viewing of a naked-eye user. The design of grayscale of the display sub-pixel unit and the disturbing sub-pixel unit may be selected according to actual requirements, and embodiments of the present disclosure do not limit it.

It is to be noted that, in at least one embodiment of the present disclosure, the only consideration is in that a sub-pixel unit of one color in each of pixel units include a display sub-pixel unit and a disturbing sub-pixel unit that correspond to its color, and a sub-pixel unit of other color in the pixel unit may not be restricted. With reference to an example in which a sub-pixel unit 110 of the first color in the above embodiment is contained in a pixel unit, in an instance that lights emitted by a sub-pixel unit of other color have a same polarization state (namely, they will not play a role of preventing peep), lights with two polarization states emitted by the sub-pixel unit of the first color can also allow a displayed image provided by pixel units to produce interference with the viewing of a naked-eye user.

At least one embodiment of the present disclosure does not limit other structure than a sub-pixel unit of the first color in a pixel unit. For example, in at least one embodiment of the present disclosure, each of pixel units further includes at least one sub-pixel unit of other colors in addition to the sub-pixel unit of the first color. For example, in at least one embodiment provided by the present disclosure, at least one of sub-pixel units of other colors includes a display sub-pixel unit and a disturbing sub-pixel unit that correspond to its color. The first optical film sheet includes sub-optical-film units arranged in correspondence with the display sub-pixel unit and the disturbing sub-pixel unit, so that polarization state of a light passing through the display sub-pixel unit and the first optical film sheet and polarization state of a light passing through the disturbing sub-pixel unit and the second optical film sheet differ from each other. For example, a sub-pixel unit of other color in the pixel unit has a same structure as a sub-pixel unit of the first color, so as to promote the disturbing ability of a disturbing image provided by the whole pixel unit to a naked-eye user.

For example, in at least one embodiment of the present disclosure, as shown in FIG. 1 and FIG. 2, each of pixel units may further include a sub-pixel unit 120 of a second color (e.g. another one of red, green and blue), and the sub-pixel unit 120 of the second color includes a display sub-pixel unit 122 of the second color and a disturbing sub-pixel unit 121 of the second color. The first optical film sheet 200 further includes a third sub-optical-film unit 230 for allowing transmission of light emitted by the display sub-pixel unit 122 of the second color and a fourth sub-optical-film unit 240 for allowing transmission of light emitted by the disturbing sub-pixel unit 121 of the second color, and the third sub-optical-film unit 230 and the fourth sub-optical-film unit 240 are so arranged that polarization states of lights emitted by the third sub-optical-film unit 230 and the fourth sub-optical-film unit 240 differ from each other.

For example, in at least one embodiment of the present disclosure, as shown in FIG. 1 and FIG. 2, each of pixel units may further include a sub-pixel unit 130 of a third color (e.g. yet another one of red, green and blue), and the sub-pixel unit 130 of the third color includes a display sub-pixel unit 132 of the third color and a disturbing sub-pixel unit 131 of the third color. The first optical film sheet 200 further includes a fifth sub-optical-film unit 250 for allowing transmission of light emitted by the display sub-pixel unit 132 of the third color and a sixth sub-optical-film unit 260 for allowing transmission of light emitted by the disturbing sub-pixel unit 131 of the third color, and the fifth sub-optical-film unit 250 and the sixth sub-optical-film unit 260 are so arranged that polarization states of lights emitted by the fifth sub-optical-film unit 250 and the sixth sub-optical-film unit 260 differ from each other.

It is to be noted that, the structure of the first optical film sheet on a sub-pixel unit of the first color, a sub-pixel unit of the second color and a sub-pixel unit of the third color may be the same. For example, polarization structure of a sub-optical-film unit on a display sub-pixel unit of each color may be the same, and polarization structure of a sub-optical-film unit on a disturbing sub-pixel unit of each color may be the same. For ease of explanation of technical solutions of the present disclosure, in some embodiments of the present disclosure, a display sub-pixel unit is used to represent a display sub-pixel unit of the first color, a display sub-pixel unit of the second color, or a display sub-pixel unit of the third color; and a disturbing sub-pixel unit is used to represent a disturbing sub-pixel unit of the first color, a disturbing sub-pixel unit of the second color, and a disturbing sub-pixel unit of the third color.

Number and colors of sub-pixel units in each of pixel units may have a variety of design modes according to specific requirements. For ease of description of technical solutions in embodiments of the present disclosure, in all embodiments of the present disclosure, one mode of pixel unit is chosen for description. For example, as shown in FIG. 2, each of pixel units, for example, may be composed of sub-pixel units of three colors (e.g., red, green, blue, or the like), which are a sub-pixel unit 110 of a first color, a sub-pixel unit 120 of a second color and a sub-pixel unit 130 of a third color, respectively. A sub-pixel unit of each color individually includes a display sub-pixel unit and a disturbing sub-pixel unit, and for example, the sub-pixel unit 110 of the first color includes a disturbing sub-pixel unit 111 of the first color and a display sub-pixel unit 112 of the first color.

For example, in the display device provided by at least one embodiment of the present disclosure, and in some of the embodiments, a display sub-pixel unit and a disturbing sub-pixel unit in a sub-pixel unit of a certain color in a pixel unit may be arranged adjacent to each other. For example, a display sub-pixel unit of the first color and a disturbing sub-pixel unit of the first color may be arranged adjacent to each other in the longitudinal direction (e.g., the direction that is parallel to the plane where the display panel is located and perpendicular to the paper plane as shown in FIG. 2) or in the lateral direction (e.g., the direction that is parallel to the plane where the display panel is located and parallel to the paper plane as shown in FIG. 2). For example, in some embodiments, a display sub-pixel unit and a disturbing sub-pixel unit in a sub-pixel unit of each color in each of pixel units may not be limited to the adjacent arrangements, as long as a sub-pixel unit of the same color includes corresponding display sub-pixel unit and disturbing sub-pixel unit. Even if a display sub-pixel unit and a disturbing sub-pixel unit are not arranged adjacently, the display effect may not be affected due to the small size of the display unit, and the anti-peep function of the display device will not be affected.

Figure 2A:
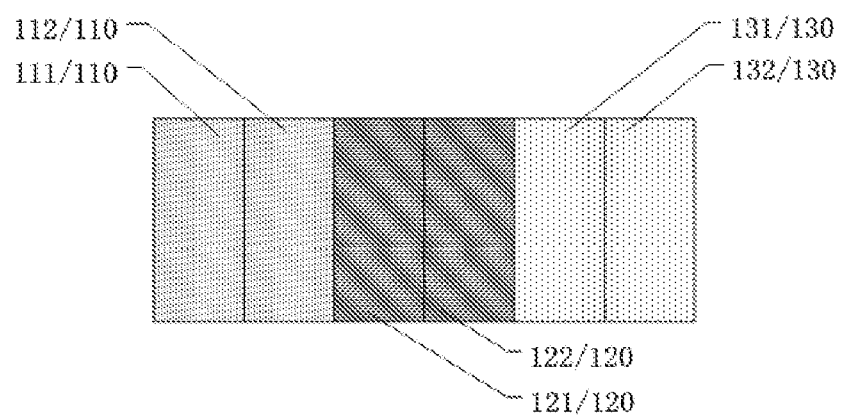
FIG. 2a is a schematically structural view showing a pixel unit at a zone A in the display device provided by an embodiment of the present disclosure shown in FIG. 2.

For example, in at least one embodiment of the present disclosure, FIG. 2a is a schematically structural view showing a pixel unit at a zone A in a display device provided by an embodiment of the present disclosure shown in FIG. 2. As shown in FIG. 2a, the arrangement direction of the sub-pixel unit 110 of the first color, the sub-pixel unit 120 of the second color and the sub-pixel unit 130 of the third color represents the lateral direction in this figure. A display sub-pixel unit and a disturbing sub-pixel unit in a sub-pixel unit of each color, for example, may be arranged laterally. For example, the arrangement of the display sub-pixel unit 112 of the first color and the disturbing sub-pixel unit 111 of the first color in the sub-pixel unit 110 of the first color is a lateral adjacent arrangement.

In at least one embodiment of the present disclosure, no restriction will be made on the specific arrangement of sub-pixel units of different colors in each of pixel units.

Figure 2B:
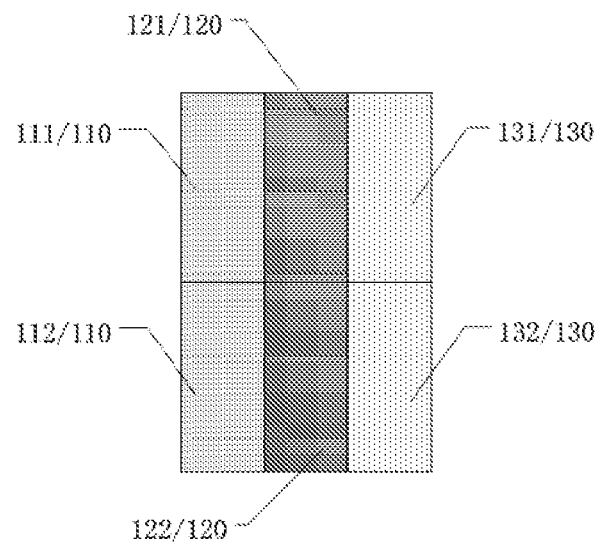
FIG. 2b is a schematically structural view showing another pixel unit at a zone A in the display device provided by an embodiment of the present disclosure shown in FIG. 2.

For example, in at least one embodiment of the present disclosure, FIG. 2b is a schematically structural view showing another pixel unit at a zone A in a display device provided by an embodiment of the present disclosure shown in FIG. 2. As shown in FIG. 2b, the arrangement direction of the sub-pixel unit 110 of the first color, the sub-pixel unit 120 of the second color and the sub-pixel unit 130 of the third color represents the lateral direction in this figure. A display sub-pixel unit and a disturbing sub-pixel unit in a sub-pixel unit of each color, for example, may be arranged longitudinally. For example, arrangement of the display sub-pixel unit 112 of the first color and the disturbing sub-pixel unit 111 of the first color in the sub-pixel unit 110 of the first color is longitudinal adjacent arrangement.

Figure 2C:
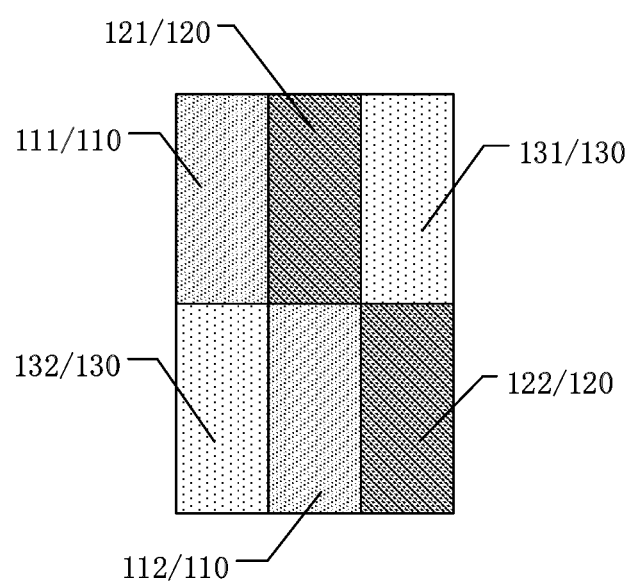
FIG. 2c is a schematically structural view showing yet another pixel unit at a zone A in the display device provided by an embodiment of the present disclosure shown in FIG. 2.

For example, in at least one embodiment of the present disclosure, FIG. 2c is a schematically structural view showing another pixel unit at a zone A in a display device provided by an embodiment of the present disclosure shown in FIG. 2. As shown in FIG. 2c, the arrangement direction of the sub-pixel unit 110 of the first color, the sub-pixel unit 120 of the second color and the sub-pixel unit 130 of the third color represents the lateral direction in this figure. A display sub-pixel unit and a disturbing sub-pixel unit in a sub-pixel unit of each color in the pixel unit may be arranged non-adjacently, for example.

For example, in at least one embodiment of the present disclosure, the display device may further include a driving circuit (e.g. an integrated circuit chip, or the like) connected to sub-pixel units. The driving circuit may be configured to control the display grayscale in a sub-pixel unit of each color in a pixel unit, and for example, the driving circuit is configured to control the display grayscale of a display sub-pixel unit of the first color and a disturbing sub-pixel unit of the first color. The level number of display grayscale may be controlled according to requirements. For example, a total of 128-level grayscales in a range of 0 to 127 may be adopted for a 16-bit system, and a total of 256-level grayscales in a range of 0 to 255 may be adopted for a 32-bit system. For example, display grayscales in a display sub-pixel unit and a disturbing sub-pixel unit in each color may be complementary with each other. In this way, a displayed image and a disturbing image are complementary images.

For example, in at least one embodiment of the present disclosure, the complementation may refer to that the sum of display grayscales in a display sub-pixel unit and a disturbing sub-pixel unit is a constant. For example, the constant may be 256 (namely 0 to 255). For example, grayscale of a display sub-pixel unit of the first color is 56 and grayscale of a disturbing sub-pixel unit of the first color is 200, then the average grayscale of first-color lights emitted by the display sub-pixel unit of the first color and the disturbing sub-pixel unit of the first color is 128. Likewise, the average grayscale of second-color lights emitted by a display sub-pixel unit of the second color and a disturbing sub-pixel unit of the second color is 128, and the average grayscale of third-color lights emitted by a display sub-pixel unit of the third color and a disturbing sub-pixel unit of the third color is 128. Then, a white light is produced after first-color to third-color lights provided wholly by each of pixel units are mixed, namely the whole display surface of the display device is white (complementary images), and a peeper cannot acquire any information, however, a user can only accept lights emitted by display sub-pixel units of the first to third colors in each of pixel units by aid of a corresponding equipment, and can normally watch an image that is actually expected to be displayed, and thus a technical effect of preventing peep can be achieved.

It is to be noted that, in at least one embodiment of the present disclosure, it is not necessarily that grayscales of lights emitted by a disturbing sub-pixel unit and a display sub-pixel unit in each of pixel units are complementary with each other to produce an interference by mixing a displayed image and a disturbing image, the thing required is to allow a displayed image not to be effectively identified by naked eyes.

For example, in at least one embodiment of the present disclosure, the display grayscale of a disturbing sub-pixel unit of the first color has a first fixed value; or the difference between display grayscale of a display sub-pixel unit of the first color and display grayscale of a disturbing sub-pixel unit of the first color has a second fixed value. For example, in terms of 0 to 255 grayscale, grayscale of a disturbing sub-pixel unit of the first color in a pixel unit may be selected to be a first fixed value, and for example, the first fixed value may be selected as 100; or, grayscale of a disturbing sub-pixel unit may be equal to grayscale of a display sub-pixel unit plus (or subtracted by) some second fixed value, and for example, the second fixed value may be 50. When the value obtained by adding 50 is greater than 255, a value obtained by further subtracting 255 from it serves as grayscale of the disturbing sub-pixel unit. For example, design of display grayscale of a disturbing sub-pixel of other colors in the pixel unit may refer to the above design mode of a disturbing sub-pixel unit of the first color, and embodiments of the present disclosure do not repeat the details here.

In at least one embodiment of the present disclosure, its technical solution is applicable to a variety of display panels.

For example, an example of the display panel is a liquid crystal display panel, which includes an array substrate and an opposite substrate that are disposed oppositely so as to form a liquid crystal cell with a liquid crystal material filled therein. The opposite substrate is a color filter substrate, for example. A pixel electrode of each of pixel units of the array substrate is adopted to apply an electric field for controlling degree of rotation of the liquid crystal material so as to perform a display operation. Generally, the liquid crystal display panel includes a first polarizer located on the array substrate side and a second polarizer located on the opposite substrate side, and polarization directions of the first polarizer and the second polarizer are substantially perpendicular to each other. The first polarizer and the second polarizer cooperate with the liquid crystal layer so as to achieve display, and a light exiting from the opposite substrate is a linearly polarized light, the polarization direction of which is the same as the polarization direction of the second polarizer. In an embodiment of the present disclosure, for example, a first optical film sheet is disposed on an opposite substrate of the liquid crystal display device, for example, and located on an outer side (display side) of the second polarizer. A portion of the first optical film sheet in correspondence with each display sub-pixel unit does not have optical rotation property, while its portion in correspondence with each disturbing sub-pixel unit has optical rotation property, and can further rotate the polarization direction of a polarized light exiting from it by 90 degrees. For example, the first optical film sheet may be implemented by a liquid crystal cell, which includes two transparent substrates and a liquid crystal layer interposed between them. In a portion which needs to play an optical rotation role, transparent electrodes are arranged on the two transparent substrates correspondingly, a driving voltage may be applied across the transparent electrodes so as to deflect liquid crystal molecules in the liquid crystal layer, and thus polarization direction of light that is transmitted by the liquid crystal layer is rotated.

For example, another example of the display panel is an organic light-emitting diode (OLED) display device, in which, layer stack of an organic light-emitting material is formed on an array substrate, and a pixel electrode of each of pixel units is used as an anode or cathode for driving the organic light-emitting material to emit light, so as to perform a display operation. Light exiting from an OLED display device is usually natural light. In an embodiment of the present disclosure, for example, a first optical film sheet is such as located on an emergent side of the OLED display device. A portion of the first optical film sheet in correspondence with each display sub-pixel unit allows an outgoing light to have a first polarization direction, while its portion in correspondence with each disturbing sub-pixel unit allows an outgoing light to have a second polarization direction, the first polarization direction and the second polarization direction being substantially perpendicular to each other. For example, the first optical film sheet may also be implemented in a liquid crystal cell, which includes two transparent substrates and a liquid crystal layer interposed between them, with a polarizer disposed on a light incident side thereof. In a portion which is required to play an optical rotation role, transparent electrodes are arranged on the two transparent substrates correspondingly, a driving voltage may be applied across the transparent electrodes so as to deflect liquid crystal molecules in the liquid crystal layer, and thus polarization direction of light that is transmitted by the liquid crystal layer is rotated.

For example, yet another example of the display panel is an electronic paper display device, in which, an electronic ink layer is formed on an array substrate included in the display panel, and a pixel electrode of each of pixel units acts to apply a voltage for driving charged micro-particles in the electronic ink to move so as to perform a display operation. Light exiting from an electronic paper display device is usually natural light, and likewise, the first optical film sheet can be implemented in the above liquid crystal cell.

According to at least one embodiment of the present disclosure, a display system is provided, which includes the above-mentioned display device and a pair of glasses. The glasses are configured to allow transmission of light emitted by a display sub-pixel of the first color in the display device, but not allow transmission of light emitted by a disturbing sub-pixel of the first color of the display device. For example, a second optical film sheet may be provided on the glasses, which may be a polarizer whose polarization structure may be the same or similar as polarization structure of a first sub-optical-film unit provided on a display sub-pixel unit of the first color, for example. Likewise, the configuration relationship of polarization structure of glasses with respect to a sub-pixel unit of the first color is also applicable to a sub-pixel unit of the second color and a sub-pixel unit of the third color.

Figure 3:
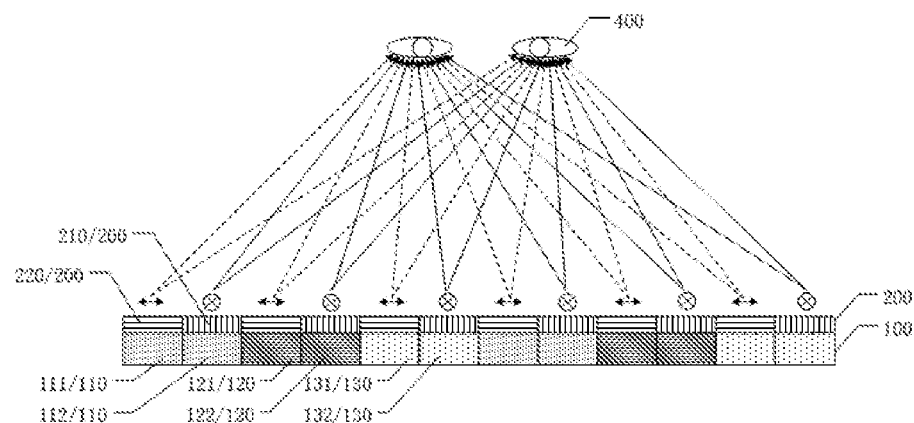
FIG. 3 is a schematically structural view showing a cross section of another display device provided by an embodiment of the present disclosure.

For example, in at least one embodiment of the present disclosure, the display system is not provided with the above glasses and only includes the above display device. FIG. 3 is a schematically structural view showing cross section of another display device provided by an embodiment of the present disclosure, in which an odd-numbered column is a disturbing sub-pixel unit, the polarization direction of light emitted from which is parallel to a paper plane (denoted by "↔"), and an even-numbered column is a display sub-pixel unit, the polarization direction of light emitted from which is perpendicular to the paper plane (denoted by "⊗"). As shown in FIG. 3, in an instance that a user is not equipped with glasses (namely "naked eye"), lights that are sent by a display sub-pixel unit and a disturbing sub-pixel unit of the display device and transmitted through a first optical film sheet 200 both will enter the user's eyes. These lights include light emitted by the disturbing sub-pixel unit (for displaying a disturbing image) and light emitted by the display sub-pixel unit (for displaying a displayed image), the disturbing image and the displayed image enter human eyes simultaneously and the displayed image cannot be distinguished consequently. So it can prevent a person who doesn't wear glasses from peeping.

For example, in at least one embodiment of the present disclosure, the display system is provided with the above glasses, and FIG. 4 is a schematically structural view showing a display system provided by an embodiment of the present disclosure. As shown in FIG. 4, the polarization state of light emitted by a disturbing sub-pixel unit and transmitted through a first optical film sheet 200 in the display device does not match polarization structure of the glasses, so that it will be blocked by the glasses 300, and a disturbing image formed by this part of light will not enter human eyes 400; while polarization state of light emitted by a display sub-pixel unit and transmitted by the first optical film sheet 200 matches the polarization structure of the glasses, so a displayed image formed by this part of light can be normally received by human eyes 400.

For ease of explaining the working principle of a display device in the above display system more specifically, in an example of at least one embodiment of the present disclosure, for example, description will be made with reference to a sub-pixel unit of the first color, where it is postulated that light emitted from a first sub-optical-film unit is a first polarized light, light emitted from a second sub-optical-film unit is a second polarized light, and polarization states of the first polarized light and the second polarized light differs from each other.

For example, in this example, as shown in FIG. 4, the first polarized light and the second polarized light are linearly polarized lights. The first polarized light is formed by transmission of light emitted from a display sub-pixel unit 112 of the first color through a first sub-optical-film unit 210, and is used to form a displayed image; the second polarized light is formed by transmission of light emitted from a disturbing sub-pixel unit 111 of the first color through a second sub-optical-film unit 220, and is used to form a disturbing image. The polarization direction of the polarization structure of glasses 300 matches the polarization direction of the first polarized light, then the first polarized light can be transmitted by the glasses 300 so as to present the displayed image to eyes 400, and the second polarized light cannot be transmitted through the glasses 300. In this way, a user wearing glasses 300 can see the displayed image formed by the first polarized light and will not see the disturbing image formed by the second polarized light. So, the user wearing glasses 300 will not be affected by the disturbing image. Accordingly, a user who does not wear the glasses 300 will see the disturbing image, and thus cannot distinguish the displayed image, so that the display device has an anti-peep function.

In the instance as shown in FIG. 2, a second optical film on a corresponding glass has a polarizer, and the polarization direction of light transmitted through the polarizer and the polarization direction of linearly polarized light exiting from a disturbing sub-pixel unit of the display device are substantially perpendicular to each other. In this way, light exiting from a disturbing sub-pixel unit will be filtered out. While a portion of non-polarized light exiting from a display sub-pixel unit of the display device that has the same polarization direction as the polarizer can be transmitted, so as to be provided to a user for watching.

The polarization structures of the first sub-optical-film unit and the second sub-optical-film unit allow the polarization direction of a first polarized light that has been transmitted and the polarization direction of a second polarized light to be different, and preferably, the polarization direction of the first polarized light is perpendicular to the polarization direction of the second polarized light. For example, in an instance that the polarization directions are perpendicular to each other, for example, the polarization structure on the glasses allows the polarization direction of a transmitted light to be identical as the polarization direction of the first polarized light, and then the first polarized light will be totally transmitted through the glasses and the second polarized light will be totally blocked by the glasses. In this way, effects of display and anti-peep of the display system are improved.

For example, in at least one embodiment of the present disclosure, the first polarized light and the second polarized light may be circularly polarized lights. For example, a first optical film layer may further include a quarter-wave plate for converting a linearly polarized light into a circularly polarized light, so that the first polarized light and the second polarized light are circularly polarized lights. In this case, the structures of the first sub-optical-film unit and the second sub-optical-film unit allow the polarization direction of a first polarized light that is transmitted is opposite to the polarization direction of a second polarized light (namely, they have opposite rotation directions). Moreover, the polarization structure on the glasses may also include a quarter-wave plate, so that an incident circularly polarized light is converted into a linearly polarized light, then, it travels through a liner polarizer (a polarizer whose transmitted light is linearly polarized light), and consequently, a displayed image can be seen by a user, while a disturbing image will not been seen by the user. In the above preferred conditions, the first polarized light can be totally transmitted through the glasses and the second polarized light will be totally blocked by the glasses, and the display and anti-peep of the display system can also be improved.

At least one embodiment of the present disclosure provides a driving method for any one of the display devices according to the embodiments. The method comprises: driving a display sub-pixel unit of a first color in the display panel so as to display a displayed image of the first color; driving a disturbing sub-pixel unit of the first color in the display panel so as to display a disturbing image of the first color. Driving of a display sub-pixel unit and a disturbing sub-pixel unit in a sub-pixel unit of other colors (e.g., a sub-pixel unit of a second color and a sub-pixel unit of a third color) in the pixel unit may be consistent with the driving method of a sub-pixel unit of the first color. For example, the embodied structure of the display device in the driving method in at least one embodiment of the present disclosure may refer to relevant contents in aforesaid embodiments (about the display devices), and embodiments of the present disclosure do not repeat the details here.

For example, in the driving method provided by at least one embodiment of the present disclosure, a sub-pixel of each color may be driven by a driving circuit connected with sub-pixel units. For example, the driving circuit may drive a display sub-pixel unit of a first color in the display panel so as to form a displayed image of the first color; and to drive a disturbing sub-pixel unit of the first color in the display panel so as to form a disturbing image of the first color. Meanwhile, it is possible to control display grayscales of a displayed image of the first color and a disturbing image of the first color by controlling a data voltage of the driving circuit, for example, to make the displayed image of the first color and the disturbing image of the first color be complementary images, for example. In this way, a disturbing function of the disturbing image of the first color on the displayed image of the first color is achieved. For example, in an example of the embodiment, it is possible that display grayscales of a displayed image of the first color that is formed by a display sub-pixel unit of the first color and a disturbing image of the first color that is formed by a disturbing sub-pixel unit of the first color are controlled, so as to allow the displayed image of the first color and the disturbing image of the first color to be complementary with each other, and display grayscales of displayed image and disturbing image in a sub-pixel unit of the second color and a sub-pixel unit of the third color are respectively controlled to be complementary with each other. In this way, an image obtained by superimposing of all of disturbing images and displayed images is displayed in white, that is, the display device appears to be a white picture, and anti-peeping is achieved.

At least one embodiment of the present disclosure also provides a display method of the display system in the above embodiment. The method may include the following steps: controlling a display sub-pixel unit of a first color in the display panel so as to display a displayed image of the first color; controlling a disturbing sub-pixel unit of the first color in the display panel so as to display a disturbing image of the first color; and blocking the disturbing image of the first color and allowing the displayed image of the first color to be transmitted by a pair of glasses. The method is also applicable to sub-pixel units of other colors in the pixel unit, that is, the glasses allow a displayed image that is displayed by a display sub-pixel unit of a sub-pixel unit of each color in the pixel unit to be transmitted therethrough and block a disturbing image that is displayed by a disturbing sub-pixel unit of a sub-pixel unit of each color in the pixel unit. In this way, while a mixed image composed of a disturbing image and a displayed image produces interference with the watching of a peeper, a user wearing a specialized equipment (e.g., a pair of glasses 300 in the above embodiments) can watch the displayed image normally.

At least one embodiment of the present disclosure provides a display device and a driving method thereof, a display system and a display method thereof, and may have at least one of the following beneficial effects:

(1) At least one embodiment of the present disclosure provides a display device, which allows simultaneous display of a displayed image and a disturbing image that are formed by lights with different polarization states so as to produce interference with the watching of a peeper, and thus the peeping is prevented, and moreover, the effect of preventing peeping will not restricted by the viewing angle.

(2) in a display device provided by at least one embodiment of the present disclosure, the display device may select grayscales of a display sub-pixel unit and a disturbing sub-pixel unit in a pixel unit to have a complementary relationship, or the like, for example, so as to produce interference in the displayed image.

(3) At least one embodiment of the present disclosure provides a display system including specialized glasses, which cooperate with the display device in any one of aforesaid embodiments to allow a user to receive a displayed image without being affected by a disturbing image, and will not have restriction on the viewing angle of the user.

The following points should be noted for the disclosure:

(1) The accompanying drawings in the embodiments of the present disclosure only involve structures relevant to the embodiments of the present disclosure, and other structures may refer to a common design.

(2) For clarity, in the accompanying drawings for describing the embodiments of the present disclosure, the thickness of layers or regions is enlarged or reduced. That is, the accompanying drawings are not drawn according to actual scales.

(3) Without conflict, the embodiments of the present disclosure and the features in the embodiments can be combined with each other to obtain new embodiments.

The described above are only specific embodiments of the present disclosure, and the present disclosure is not intended to be limited thereto. The scope of the present disclosure is defined by the claims.

What is claimed is:

1. A display device, comprising
a display panel, including a plurality of pixel units; and
a first optical film sheet provided on a light emergent side of the display panel;
wherein at least one of the pixel units includes a sub-pixel unit of a first color consisting of one of Red, Green and Blue color, and the sub-pixel unit of the first color includes a display sub-pixel unit of the first color and a disturbing sub-pixel unit of the first color,
the display sub-pixel unit of the first color is configured to emit light for display of a displayed image, and the disturbing sub-pixel unit of the first color is configured to emit light for display of a disturbing image;
the first optical film sheet includes a first sub-optical-film unit provided correspondingly on the display sub-pixel unit of the first color and configured to allow the transmission of light emitted by the display sub-pixel unit of the first color, and a second sub-optical-film unit provided correspondingly on the disturbing sub-pixel unit of the first color and configured to allow transmission of light emitted by the disturbing sub-pixel unit of the first color, and the first sub-optical-film unit and the second sub-optical-film unit being arranged to allow polarization states of lights emitted from the first sub-optical-film unit and the second sub-optical-film unit to differ from each other; and
the first sub-optical-film unit is configured to allow a transmitted light to be a non-polarized light, and the second sub-optical-film unit is configured to allow a transmitted light to be a polarized light, polarization states of lights for displaying two kinds of images differ from each other, the polarized light that forms the disturbing image is removed by a pair of glasses with polarizers, and the light that forms the displayed image is at least partially transmitted, so as to provide a user with a normal displayed image.

2. The display device according to claim 1, wherein the second sub-optical-film unit is configured to allow a transmitted light to be a linearly polarized light.

3. The display device according to claim 1, wherein the display sub-pixel unit of the first color and the disturbing sub-pixel unit of the first color are adjacent to each other in a longitudinal direction or a lateral direction of the display panel.

4. The display device according to claim 1, further comprising a driving circuit connected with the sub-pixel units, wherein the driving circuit is configured to control a display grayscale of the display sub-pixel unit of the first color and a display grayscale of the disturbing sub-pixel unit of the first color.

5. The display device according to claim 4, wherein the driving circuit is configured to allow the display grayscale of the display sub-pixel unit of the first color and the display grayscale of the disturbing sub-pixel unit of the first color to be complementary with each other.

6. The display device according to claim 4, wherein the display grayscale of the disturbing sub-pixel unit of the first color has a first fixed value; or
difference between the display grayscale of the display sub-pixel unit of the first color and the display grayscale of the disturbing sub-pixel unit of the first color has a second fixed value.

7. The display device according to claim 1, wherein at least one of the pixel units further includes at least one sub-pixel unit of other color in addition to the sub-pixel unit of the first color.

8. The display device according to claim 7, wherein at least one of the sub-pixel units of other colors includes a display sub-pixel unit and a disturbing sub-pixel unit corresponding to its color; and
the first optical film sheet includes sub-optical-film units disposed corresponding to the display sub-pixel unit and the disturbing sub-pixel unit, respectively, so that polarization state of light passing through the display sub-pixel unit and the first optical film sheet and polarization state of light passing through the disturbing sub-pixel unit and the first optical film sheet differ from each other.

9. A display system, comprising:
a display device, wherein the display device comprises:
a display panel, including a plurality of pixel units; and
a first optical film sheet provided on a light emergent side of the display panel;
wherein at least one of the pixel units includes a sub-pixel unit of a first color consisting of one of Red, Green and Blue color, and the sub-pixel unit of the first color includes a display sub-pixel unit of the first color and a disturbing sub-pixel unit of the first color,
the display sub-pixel unit of the first color is configured to emit light for display of a displayed image, and the disturbing sub-pixel unit of the first color is configured to emit light for display of a disturbing image;
the first optical film sheet includes a first sub-optical-film unit provided correspondingly on the display sub-pixel unit of the first color and configured to allow the transmission of light emitted by the display sub-pixel unit of the first color, and a second sub-optical-film unit provided correspondingly on the disturbing sub-pixel unit of the first color and configured to allow transmission of light emitted by the disturbing sub-pixel unit of the first color, and the first sub-optical-film unit and the second sub-optical-film unit being arranged to allow polarization states of lights emitted from the first sub-optical-film unit and the second sub-optical-film unit to differ from each other; and
the first sub-optical-film unit is configured to allow a transmitted light to be a non-polarized light, and the second sub-optical-film unit is configured to allow a transmitted light to be a polarized light; and
a pair of glasses with polarizers configured to allow transmission of light emitted by the display sub-pixel unit of the first color of the display panel, and to block light emitted by the disturbing sub-pixel unit of the first color of the display panel, polarization states of lights for displaying two kinds of images differ from each other, the polarized light that forms the disturbing image is removed by the pair of glasses with the polarizers, and the light that forms the displayed image is at least partially transmitted, so as to provide a user with a normal displayed image.

10. A driving method of the display device according to claim 1, comprising:
driving the display sub-pixel unit of the first color in the display panel so as to be used for forming a displayed image of the first color; and
driving the disturbing sub-pixel unit of the first color in the display panel so as to be used for forming a disturbing image of the first color.

11. The driving method according to claim 10, wherein the displayed image and the disturbing image are complementary images.

12. A display method of the display system according to claim 9, comprising:
   controlling the display sub-pixel unit of the first color in the display panel so as to form a displayed image of the first color;
   controlling the disturbing sub-pixel unit of the first color in the display panel so as to form a disturbing image of the first color; and
   blocking the disturbing image of the first color and allowing the displayed image of the first color to be transmitted by the pair of glasses.

13. The display device according to claim 1, wherein the display sub-pixel unit of the first color and the disturbing sub-pixel unit of the first color are adjacent to each other in a longitudinal direction or a lateral direction of the display panel.

14. The display device according to claim 2, wherein the display sub-pixel unit of the first color and the disturbing sub-pixel unit of the first color are adjacent to each other in a longitudinal direction or a lateral direction of the display panel.

15. The display device according to claim 14, further comprising a driving circuit connected with the sub-pixel units, wherein the driving circuit is configured to control a display grayscale of the display sub-pixel unit of the first color and a display grayscale of the disturbing sub-pixel unit of the first color.

16. The display device according to claim 15, wherein the display grayscale of the disturbing sub-pixel unit of the first color has a first fixed value; or
   difference between the display grayscale of the display sub-pixel unit of the first color and the display grayscale of the disturbing sub-pixel unit of the first color has a second fixed value.

* * * * *